United States Patent [19]
Richardson

[11] Patent Number: 4,950,000
[45] Date of Patent: Aug. 21, 1990

[54] FLANGED PIPELINE CONNECTIONS

[75] Inventor: Arthur W. Richardson, Cumbria, United Kingdom

[73] Assignee: Furmanite International Ltd., Kendal, England

[21] Appl. No.: 271,817

[22] Filed: Nov. 17, 1988

[30] Foreign Application Priority Data

Nov. 17, 1987 [GB] United Kingdom ............... 8726885

[51] Int. Cl.⁵ .......................................... F16L 55/18
[52] U.S. Cl. ...................................... 285/15; 285/14; 285/297; 285/363
[58] Field of Search ................. 285/15, 297, 363, 336, 285/14

[56] References Cited

U.S. PATENT DOCUMENTS

| | | | |
|---|---|---|---|
| 2,547,321 | 4/1951 | Henderson | 285/363 X |
| 3,618,989 | 11/1971 | Ito | 285/363 X |
| 3,836,159 | 9/1974 | Dryer | 285/336 X |
| 4,133,557 | 1/1979 | Ahlstone | 285/297 X |
| 4,268,070 | 5/1981 | Adams | 285/15 |
| 4,406,481 | 9/1983 | Summerell | 285/15 |
| 4,537,425 | 8/1985 | Press et al. | 285/363 X |

FOREIGN PATENT DOCUMENTS

| | | | |
|---|---|---|---|
| 0029338 | 5/1981 | European Pat. Off. | |
| 0082792 | 6/1983 | European Pat. Off. | |
| 2838511 | 3/1980 | Fed. Rep. of Germany | |
| 636776 | 4/1928 | France | 285/297 |
| 2426852 | 1/1980 | France | 285/15 |
| 373934 | 1/1964 | Switzerland | |
| 219775 | 8/1924 | United Kingdom | |
| 504168 | 4/1939 | United Kingdom | 285/297 |
| 997765 | 7/1963 | United Kingdom | |
| 1055454 | 1/1967 | United Kingdom | |
| 1169840 | 11/1969 | United Kingdom | |

Primary Examiner—Dave W. Arola
Attorney, Agent, or Firm—Arnold J. Ericsen; C. Thomas Sylike

[57] ABSTRACT

A system for sealing leaks of flanged pipe couplings comprises providing a peripheral space between faces of the flanges and in the region of that space a loose ring in facing annular grooves of the flange faces. Should a leak occur between the flanges of the coupling the loose ring allows process fluid to escape past the ring to reduce the effect of localized pressure that may otherwise distort or damage the flange faces.

3 Claims, 11 Drawing Sheets

FLANGED PIPELINE CONNECTIONS

DESCRIPTION

This invention concerns flanged pipeline connections and in particular provisions for resealing same in the event of a leak.

Flanged pipeline connections usually involve coupling of flanged pipe ends together by means of nuts and bolts the flanges having a sealing gasket therebetween. Leakages can occur from such connections due to failure of the gasket or due to movement of the pipeline putting strain on the coupling. Sealing a flanged connection after such a leak is often achieved by enclosing the flanged connection and filling the enclosure with a sealing substance.

The various methods and apparatus for enclosing a flange coupling to reseal it can be expensive and also difficult to fit in circumstances wherein toxic, corrosive or pressurised materials are being transferred along the pipeline.

This invention has for its object the facilitating of resealing flanged pipeline couplings.

According to this invention a system for sealing leaks of flanged pipe couplings comprises providing a peripheral space between faces of the flanges and in the region of that space a loose ring.

Should a leak occur between the flanges of the coupling the loose ring allows process fluid to escape past the ring and so reduce the effect of localised pressure that may otherwise distort or damage the flange faces. In addition, sealing compound may be injected into the space beyond the ring in order to seal the leak.

In one preferred embodiment of the invention the ring is retained in facing annular grooves of the flange faces.

The ring is preferably located in a relatively low stress area of the flange coupling which will probably be outside the bolting line of the flange coupling.

In another preferred embodiment the ring extends inwards beyond the bolting line. The inward edge of the ring may be formed as a pair of flexible jaws such that pressure of injection of leak sealant forces the jaws outwards against flange faces to prevent sealant escaping back beyond the ring.

The ring itself may be provided with one or more injection tappings so that sealing compound can be injected directly through the ring. The injection tappings may be left open so that leaking material may exhaust before leak sealing is commenced. Alternatively a bolt fitting injection device may be used for injection sealing compound into the space between the flanges.

The system of the invention may be installed when the flanged coupling is first made or may be installed later say as part of routine inspection and overhaul. The flanges of the pipe coupling may then be machined to reduce the flanges to provide the peripheral space and, if necessary, to form the annular grooves.

The invention, therefore, comprehends a method of providing a flanged pipe coupling with a leak sealing system as well as a flanged pipe coupling fitted with a leak sealing system.

This invention will now be futher described, by way of example only, with reference to the accompanying drawings, in which.

Figure 1:
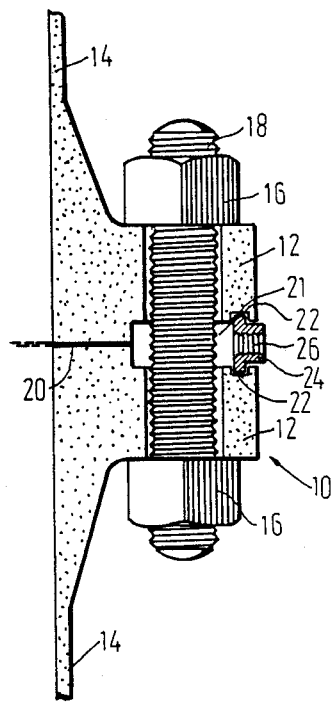
FIG. 1 shows a first embodiment of the invention.

Referring to FIG. 1 of the accompanying drawings a pipeline coupling 10 is formed between facing flanges 12 of pipe sections 14 drawn together by nuts and bolts 16, 18 respectively trapping a gasket 20 between the flange faces. Each flange is reduced peripherally so as to leave a peripheral space 21 between the flange faces when they are coupled together. Near their outer edges, the flanges 12 also have annular grooves 22 that are aligned with each other. Fitted loosely in the grooves 22 is a ring 24 preferably of the same material as the flanges. The ring 24 has several injection tappings 26 for direct injection of sealing material. The ring 24 and grooves 22 are actually sized so that ring will not interfere with the drawing together of the flanges.

The ring 24 is actually located outside the bolting line near to the edge of the flanges. This location is chosen as being a low stressed area so that the integrity of the flange coupling is not compromised.

The presence of the loose ring 24 means that should a leak occur from between the flanges process fluid can escape past the ring and vent to atmosphere. That prevents localised pressurisation of any parts of the flanges outside the gasket seating area so that the flange design is not compromised.

If a flange leakage does occur during service a viscous heat curable sealing compound can be injected to fill the space 21 between the gasket 20 and the ring 24 to seal the leak. In the embodiment of FIG. 1 injection of the sealing compound is via injection tappings 26.

Figure 2:
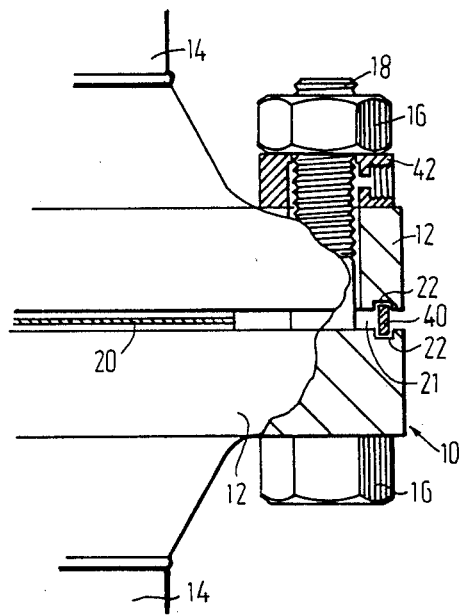
FIG. 2 shows a second embodiment of the invention.

Turning to FIG. 2 of the accompanying drawings, instead of the ring 24 with injection tappings of FIG. 1, a plain ring 40 is located in the grooves 22 of the flanges. Using a plain ring means that the flange faces do not have to reduced peripherally as much as the flanges of FIG. 1. In addition, sealing of a leak is achieved by injecting a suitable sealing compound through a bolt fitting injection device 42 that may be fitted at flange coupling or may be fitted when a leak occurs.

In other respects the embodiment of FIG. 2 is largely identical to the embodiment of FIG. 1 and like parts have been given the same reference numerals.

Figure 3:
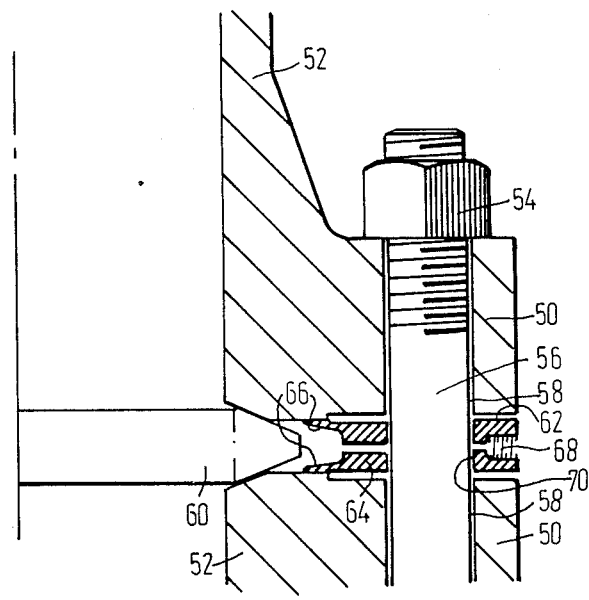
FIG. 3 shows a third embodiment of the invention.

Referring to FIG. 3 of the accompanying drawings which shows a pipeline coupling formed between facing flanges 50 of pipe sections 52 drawn together by nuts and bolts 54, 56 through aligned holes 58 of the flanges 50 trapping a hard metal lens ring gasket 60 between the flanges.

The flange faces are reduced peripherally so as to leave a peripheral space 62 therebetween into which is fitted a metal ring 64. The ring 64 has flexible jaws 66 at its inner edge which extend between the flanges beyond the peripherally reduced area. The ring 64 also has a series of injection ports 68 spaced radially about the ring. The ring 64 also has holes 70 therethrough for the bolts 56. The ring 64 is generally loose between the flanges other than for retention of the flexible jaws.

Pipeline couplings involving the use of hard metal lens ring gaskets are considered more likely to leak heavily during a leak sealing operation because of the minute compression of the gasket material and the effect of injection pressure on the flange faces. The ring 64, however, reduces these problems by reducing the flange area over which leak sealant injection pressure is exerted, injection of sealant being via injection ports 68 through to the gasket itself the flexible jaws 66 being expanded to prevent return of sealant back past the ring 64.

The injection ports 68 are usually left open to allow any leak to exhaust before leak sealing is commenced. Furthermore, no additional physical or mechanical work is needed on the flanges prior to actual leak sealing.

The invention thus provides a system for sealing leaks of flanged pipe couplings that may be fitted retractively but which may also provide additional safety and effectiveness without necessitating further mechanical work or additional fittings.

I claim:

1. In a flanged pipe coupling comprising a pair of pipes for transporting process fluid, said pipes having flanged ends coupled together face to face with a gasket therebetween, the improvement comprising the combination of:
   (i) an annular space defined by annular aligned grooves formed in each of the facing flanged ends,
   (ii) a unitary annular ring of reduced height and width dimension relative to the respective height and width dimension of the aligned annular grooves to be thereby loosely retained in the said space, the said ring being of such thickness as not to interfere with sealing by the said gasket, whereby, in the event that a leak occurs from between the flanges, the process fluid may escape past the ring and vent to the atmosphere, and
   (iii) port means for receiving injected sealing compound into the said space.

2. The flanged pipe coupling as claimed in claim 1, wherein the ring is outside the bolting line of the flanged coupling.

3. The flanged pipe coupling as claimed in claim 1, wherein the annular ring has at least one injection port, said port having its longitudinal axis disposed transversely relative to the axis of the annular ring and extending through the thickness of the ring.

* * * * *